Dec. 16, 1969  J. M. PENDLETON  3,484,325
APPARATUS FOR SEALING THERMOPLASTIC FILMS
Filed July 13, 1966  3 Sheets-Sheet 1

INVENTOR
JOHN M. PENDLETON

BY
*Richard Lindberg*

ATTORNEY

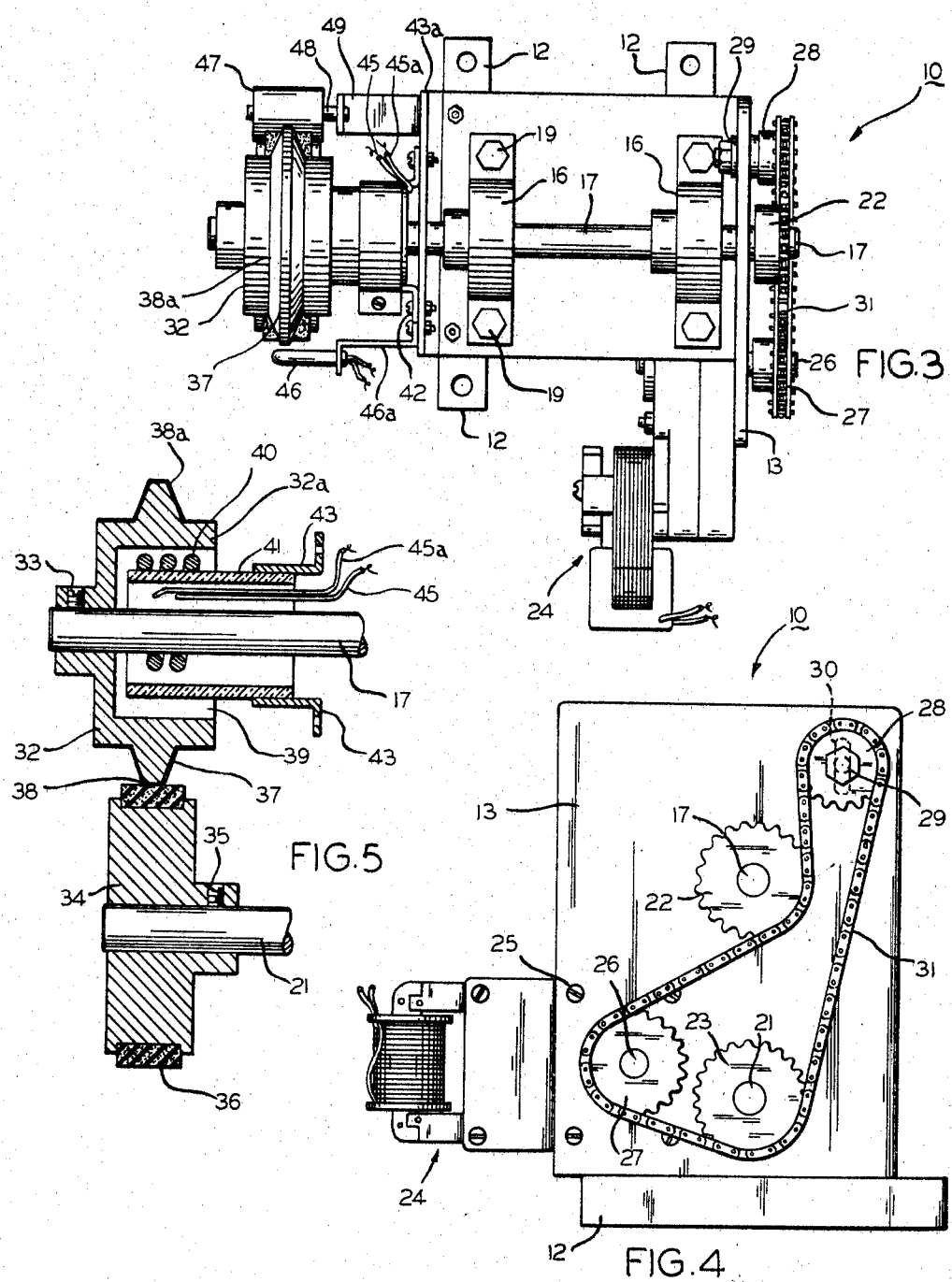

Dec. 16, 1969   J. M. PENDLETON   3,484,325
APPARATUS FOR SEALING THERMOPLASTIC FILMS
Filed July 13, 1966   3 Sheets-Sheet 3

INVENTOR
JOHN M. PENDLETON
BY
ATTORNEY

United States Patent Office 3,484,325
Patented Dec. 16, 1969

3,484,325
APPARATUS FOR SEALING THERMOPLASTIC FILMS
John M. Pendleton, 4332 N. Woodburn St.,
Shorewood, Wis. 53211
Filed July 13, 1966, Ser. No. 564,985
Int. Cl. B29c 27/00
U.S. Cl. 156—582            1 Claim

ABSTRACT OF THE DISCLOSURE

Apparatus for heat sealing thermoplastic films including a sealing wheel having a low specific heat and a high rate of conductivity, the sealing wheel having a thin annular rib to localize the heating effect, the wheel including a hollow hub of substantial axial extent for receiving radiant energy and directing the same to said annular rib, with radiant energy means extending within the hub and supplying radiant energy to the rib.

---

The structure according to the invention, while not so limited, is particularly adapted to sealing polyethylene films and films made of homologues thereof. The sealing together of these films must be done at very critical temperatures, and in many cases for a selected temperature the range thereat must not exceed 4° F. For example, if too high a temperature is employed the polymer (polyethylene) may break down into gaseous ethylene. Polypropylene will break down into its monomer, propylene. On the other hand, temperatures which are too low will not enable the films to seal together.

In carrying out my invention, I employ a heated sealing roller treated with a tetrafluorocarbon coating to provide a heat resistant surface contacting the film and incapable of sticking thereto. The so-coated roller engages the two films to be sealed against a moving anvil surface or roller which is coated with a silicone-type rubber, and incapable of sticking to the film.

At the instant of heating of the films, they are actually in a localized molten state, and the films must be moved rapidly away from the heated sealing roller, else a hole be made in the polymer film. The heating of the sealing roller is done by radiation from an exactly controlled heating element, the radiation being to the sealing roller which is of small mass and made of a metal of very low specific heat, so as to minimize greatly any heat sink effect.

In controlling the heat impression roller a sensor is located at the periphery thereof, the sensor and its accompanying control being adapted to control the roller periphery temperature to ±1° F. Preferably, the heat sealing roller is located near a pair of trailing rollers which rapidly remove any heat from the seal, so that the film may readily return to its pre-sealed condition.

With the foregoing considerations in mind, it is a principal object of the invention to provide improved apparatus for sealing thermoplastic films, particularly film polymers of the olefin series.

Another object is to provide apparatus for sealing a pair of films while the same are moving at a speed of fifty feet per minute, and to nicely control the temperature of heat sealing roller during such sealing operation.

Other objects and important features of the invention will be apparent from a study of the specification following taken with the drawings which together describe and illustrate a preferred embodiment of the invention and what is now considered to be the best mode of practising the principles thereof. Other embodiments may be suggested to those having the benefit of the teachings herein, and such other embodiments are intended to be reserved especially as they fall within the scope of the subjoined claim.

In the drawings:

FIG. 3 is a plan view thereof;

FIG. 4 is a view looking in the direction of the arrows 4—4 of FIG. 1;

FIG. 5 is a vertical sectional view taken along the line 5—5 of FIG. 2, looking in the direction of the arrows;

Figure 1:
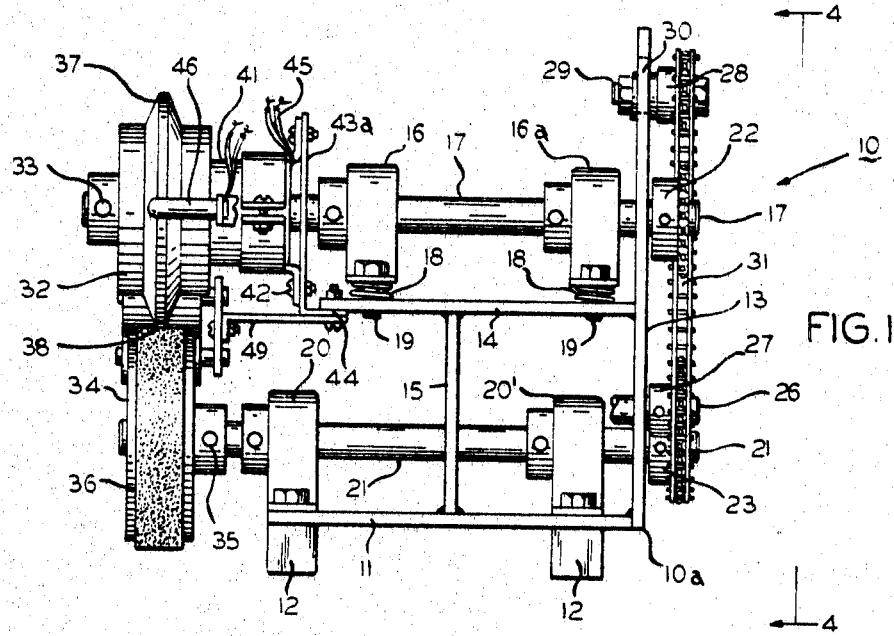
FIG. 1 is a side elevation view of apparatus according to the present invention for sealing thermo-plastic films.

Referring now particularly to FIGS. 1 to 6, one embodiment of the present invention is referred to generally by the reference numeral 10 and includes a frame 10a consisting of a base plate 11 mounted on base members 12 having a vertical frame plate 13. A frame plate 14 is spaced above base plate 11 upon a strut 15 and has one side thereof joined to the vertical frame plate 13.

Top frame plate 14 acts as a mounting for spaced bearings 16 and 16a having a horizontal shaft 17 turning therein. Bearings 16 and 16a are resiliently supported on springs 18, and cap screws 19 threaded into plate 14 locate the shaft 17 and bearings 16 and 16a for such resilient mounting. Lower plate 11 supports laterally spaced bearings 20 and 20a for a horizontal shaft 21.

The ends of shafts 17 and 21 extend through the vertical frame plate 13, and shafts 17 and 21 have respective sprockets 22 and 23 fast thereon. The two shafts 17 and 21 are driven through the medium of a variable speed motor and speed reducer 24, held by screws 25 to the vertical frame 13. Motor-speed reducer 24 has a drive shaft 26 extending through frame plate 13, and a drive sprocket 27 is fast to the protruding end of shaft 26. An adjustable idler sprocket 28 for an endless drive chain 31 is rotatably mounted on a stud shaft 29 engaged in slot 30 in the frame plate 13, and the endless chain 31 is trained about drive sprocket 27, sprockets 22 and 23, and the idler sprocket 28.

The two shafts 17 and 21 have respectively mounted thereon a sealing wheel 32 and an anvil wheel 34. Sealing wheel 32 is held fast on shaft 17 by a set screw 33, and anvil wheel 34 is held fast on shaft 21 by a set screw 35. The periphery of the anvil wheel 34 is covered with a band 36 constructed of materials known as silicon substituted hydrocarbons or organo-polysiloxanes, known sometimes in the art as silicone rubber. The material constituting the band has the property of not sticking to films of polyethylene or polypropylene while they are heated.

The sealing wheel 32 is generally cup-shaped in cross-section, and includes an annular flange 32 having an annular rib 37 with a cylindrical surface 38 extending therefrom. The rib 37 and cylindrical surface 38 are coated electrostatically with a relatively thin film 38a of a material generally known as tetrafluoroethylene or tetrafluoroethylene-hexafluoropropylene, and sometimes known by the trademark "Teflon," a Dupont trademark.

The anvil wheel 34 may likewise be coated with tetrafluoroethylene, this product also having the property of not sticking to polyethylene.

The sealing wheel 32 is formed of a metal having a very low specific heat, such as aluminum, to minimize any heat sink effect. Other metals, such as copper, having the property of rapid heat conduction may be used equally as well.

Heat is adapted to be radiated to the annular rib 37 by a resistance coil 40 supported on a cylindrical insulator 41 extending into a cylindrical recess 39 in the sealing wheel 32. Insulator 41 surrounds the drive shaft 17 for sealing wheel 32 and is supported on a bracket 43 having mounting ears 42 secured to a frame support 43a extending upward from plate 14 and secured thereto at 44. Power leads 45 and 45a supply the resistance coil 41.

There is a temperature of the rib 37 and surface 38 is measured by sensing device 46, closely adjacent to the sealing wheel 32, and is supported on an arm 46a connected to bracket 43 in any convenient manner.

A pair of trailing seal cooling and flattening rollers 47 are located adjacent the sealing wheel 32 and anvil wheel 34, and are rotatably mounted on stub shafts 48, supported on brackets 49 extending from plate support 14.

Figure 8:
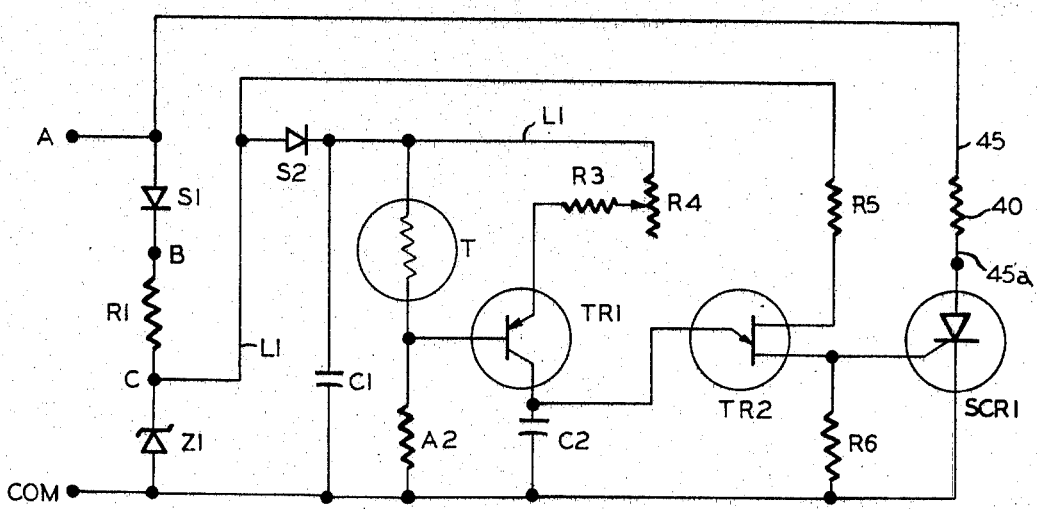
FIG. 8 is a schematic for controlling the heat supplied to the apparatus seen in the several previous views.

Structure is provided for controlling carefully the temperature of the sealing wheel 32, and as seen in FIG. 8, there is shown a control circuit for such purpose. The circuit shown in FIG. 8 may be considered of a closed-loop error-sampling type, and incorporates solid-state circuitry to control the amount of electrical energy to a heating element 40 for maintaining the temperature of sealing wheel 32. Temperatures thereat in the range of 200° F. to 400° F. can be controlled to within one degree.

As seen in FIG. 8, input energy at 115 A.C. at 60 cycles is impressed across terminals labeled A and COM. A diode S1 passes only the positive half-cycle at B. Diode S1 is connected in series with a resistor R1 and a Zener regulator Z1, in such a fashion that Zener Z1 limits the voltage of the positive half-cycle to some lower value as 20 volts. Resistor R1 is a current limiting resistor to maintain the Zener Z1, within its dissipation rating.

A capacitor C1 is connected across a lead L1 and lead COM and is charged at the peak voltage level through a diode S2, a constant DC voltage of 20 volts being maintained across capacitor C1. Capacitor C1 is of sufficient capacity to insure a very small amount of ripple to the circuitry in the tank circuit, and diode S2 prevents capacitor C1 from discharging back into the supply line.

Sensor 46 at the sealing wheel 32 contains a temperature sensing device or thermistor T. Thermistor T is connected in series with a resistor R2 and across leads L1 and COM. Resistor R2, R3, and R4, together with transistor TR1, comprise a constant current generator which is regulated by variable transistor R4, which also serves as a temperature setting control. The circuit thus far described charges capacitor C2, and when the voltage across capacitor C2 has reached a high enough level, of the order of 10 to 12 volts, a unijunction transistor TR2 will conduct so as to deliver the charge on capacitor C2 to a resistor R6 and a gate terminal of a silicon control rectifier SCR1. The voltage required to conduct transistor TR2 is a function of the interbase voltage applied to the transistor TR2 and its intrinsic standoff ratio.

Interbase voltage for transistor TR2 is derived from point C through a resistor R5, and the latter is utilized for temperature compensation of transistor TR2. Interbase voltage is taken from point C so that the charging of the capacitor C2 is synchronized with the line power frequency.

When capacitor C2 discharges into resistor R6, a short duration pulse occurs and is transferred to the gate terminal of transistor SCR1, the latter in turn conducting the energy to flow through the heating element 40.

As the heating element 40 is raised in temperature, so does also thermistor T, which has been placed in close proximity to the heater element. As the latter raises in temperature, its resistance lowers, and by reason of the voltage divider action of resistor R2 and thermistor T, the magnitude of the base drive voltage to transistor TR1 is reduced, causing a smaller voltage to appear across the resistors R3 and R4. The voltage available to charge capacitor C2 is then reduced, causing capacitor C2 to charge at a slower rate. This causes transistor TR2 to conduct at a later time in the cycle, as will also transistor SCR1. A lower RMS value of voltage is thus available for the heating element 40 which limits the amount of energy available therefrom.

The system, being a closed loop inverse feedback system, is inherently stable as to the thermal environment. The gain of the system is adjusted by the proximity of the thermistor T to the heater element 40. Placement of the thermistor T very close to the heater element 40, increases system gain offering closer temperature control at the cost of reducing temperature. The controller described regulates temperature to plus or minus 1° F., over a range of 250° to 350° F.

Figure 2:
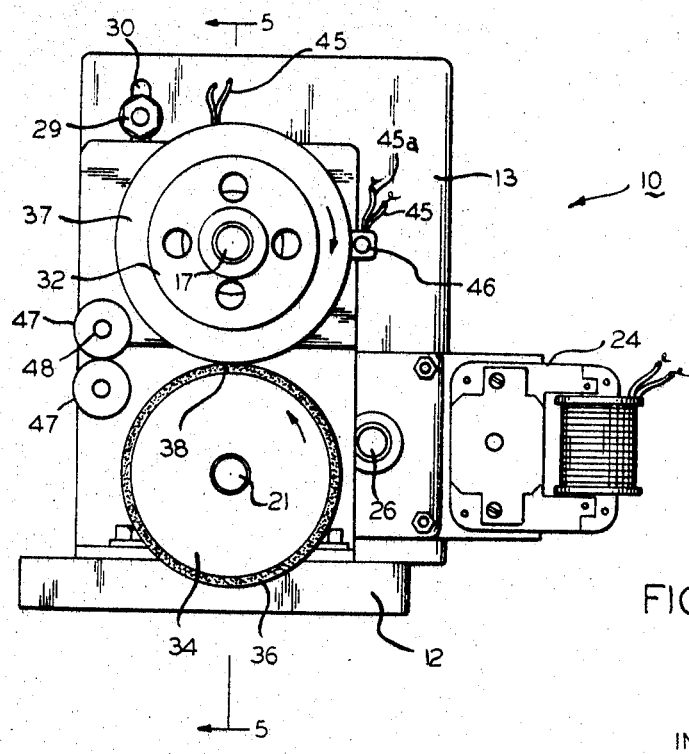
FIG. 2 is a front elevation view thereof.

In the form of the invention seen in FIGS. 1 to 5, the plies of polyethylene film material to be sealed are moved from the right to the left, as seen particularly in FIG. 2, between the sealing roller 32 and the anvil roller. The seal is effected between the two plies by the roller 32, and after the seal is effected the same is cooled between the trailing rollers 47, 47 as the plies are brought therebetween. The bias of the springs 18 causes the sealing roller 32 to firmly grip the plies, and the nicely controlled heat applied thereto completes the seal, subsequent chilling of the seal being achieved by rolls 47, 47.

Figure 6:
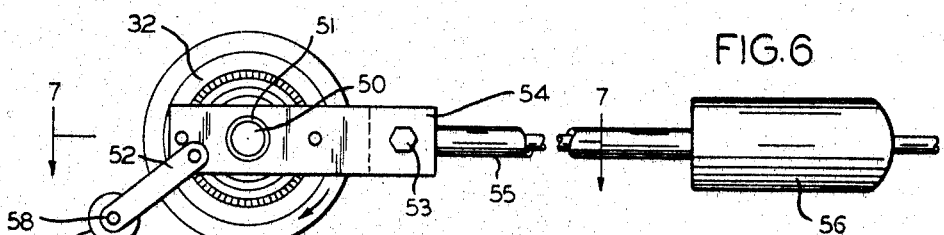
FIG. 6 is a front elevation view of a modified form of the invention, particularly adapted for hand operation.
Figure 7:
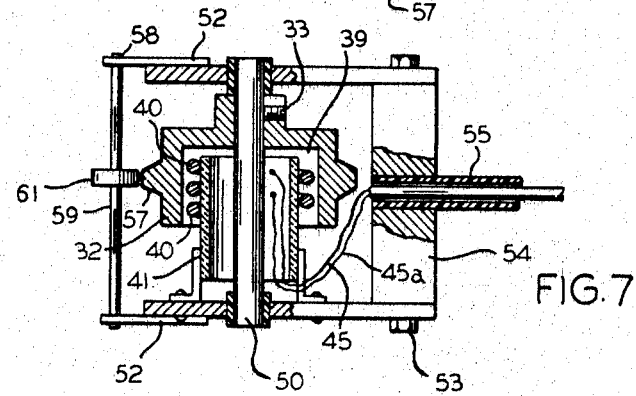
FIG. 7 is a sectional view taken along the line 7—7 of FIG. 6 looking in the direction of the arrows.

Referring now to FIGS. 6 and 7, there is shown another embodiment particularly adapted for hand use with a stationary anvil surface. In the modification shown in FIGS. 6 and 7, the sealing wheel 32 is mounted on a shaft 50 journalled in bearings 51 in a pair of yoke arms 52, which are attached by screws 53 to an abutment member 54. A tubular handle arm 55 has a conventional handle 56 through which the power leads to the heating coil 40 extend.

The plies of the material to be sealed are placed on a flat surface covered with resilient plastic material 57, such as silicone rubber or tetrafluoroethylene.

The yoke arms 52 also support trailing arms 58 having a shaft 59 extending therebetween. Shaft 59 has a cooling and trailing roller supported thereon for cooling the seal at the plies. The assembly shown in FIGS. 6 and 7 provides structure for sealing the polyethylene plies, or the like of any contour, form or shape.

Having thus described my invention, what I claim and desire to secure by letters patent in the United States is:

I claim:

1. Apparatus for sealing thermo-plastic films particularly those having critical melting temperatures which are close to the temperature where the film polymer changes to gaseous monomer such as films obtained by polymerization of unsaturated hydrocarbons of the olefin series, said apparatus comprising a sealing wheel and an anvil surface having the polymer films therebetween during the sealing thereof, said sealing wheel having a low specific heat and a high rate of conductivity to minimize any heat sink effect thereof, a coating on said anvil surface incapable of adhesion with said film polymer, and a thin coating on said heat sealing wheel, said coating being extremely compatible with wide temperature changes of said sealing wheel, means for closely controlling the temperature of said sealing wheel, an annular rib on said sealing wheel having a small surface area for localizing the heating effect of said sealing wheel, a hollow hub of substantial axial extent as compared to the axial extent of said annular rib for receiving radiant energy and directing the same to said annular rib, and radiant energy means extending within said hollow hub and spaced therefrom for supplying radiant energy to said hollow hub, said radiant energy means comprising a supporting insulating cylindrical sleeve having its axis coincident with the axis of rotation of said sealing wheel, and a radiant energy coil supported on said cylindrical sleeve and spaced from the interior of said hub.

References Cited

UNITED STATES PATENTS

| | | |
|---|---|---|
| 2,643,475 | 6/1953 | Klopfenstein. |
| 2,675,054 | 4/1954 | Langer _____ 156—583 |
| 2,987,107 | 6/1961 | Sylvester et al. ___ 156—583 X |
| 3,035,630 | 5/1962 | Hatch _____ 156—498 |
| 3,243,487 | 3/1966 | Smith _____ 264—248 |
| 3,283,395 | 11/1966 | Rownd _____ 156—583 X |

HAROLD ANSHER, Primary Examiner

R. A. KILLWORTH, Assistant Examiner

U.S. Cl. X.R.

100—93; 156—583